Patented June 24, 1930

1,767,170

UNITED STATES PATENT OFFICE

ALBERT M. COLEMAN, OF BROOKLINE, MASSACHUSETTS

SEALING COMPOUND

No Drawing.   Application filed January 2, 1929.   Serial No. 329,968.

This invention relates to sealing compounds and with regard to certain more specific features thereof to compounds adapted to prevent fluid escape through the screw threaded joints of pipe, tapered fittings, gaskets of flanged fittings and various types of connections in mechanical and oil refinery equipment.

Heretofore compositions have been proposed in which graphite, either powdered or flaked, has been distributed in liquid vehicles such as oil, mineral or vegetable, molasses, glycerine or alum and soap solutions. These have each a limited application, some being used for pipe lines carrying water but being unsuitable for gasoline, others being used for oils but unsuitable for alcohol or turpentine. None of them is adapted for general application to a largely varied range of fluid carrying lines or containers. They have also proven unsatisfactory on account of dissolving into the pipe line and discoloring and impairing the purity of the pipe carrying fluid. Compositions involving molasses as a vehicle for graphite have been sold and used to some extent with generally favorable results, as the molasses tends to expand and set in the expanded condition under the influence of heat, making such a composition particularly adaptable for sealing joints in boiler apparatus and the like. Molasses, however, is criticized for such use on several grounds. While molasses is adhesive to some extent, it is essential that the parts of the joint to be treated should be thoroughly cleaned before applying the composition. It is almost universally the case that the operations of threading a pipe, for example, are accompanied by the use of oil to facilitate the operation, and the result is a film of oil around the threads which must be cleaned away before the molasses-graphite composition can be made to adhere. Molasses is extracted from the cane under low heat treatment which leaves it, especially the low grade type used in such compositions, as a final product full of bacteria, and therefore tending to ready fermentation and the creation of destructive acids. This fermentation creates difficulties in storage and transportation, inasmuch as exposure to heat will cause bursting of the packages or blowing of the covers. The acids created cause corrosion and pitting of the metal containers and of the joints on which the compound is used.

To overcome these objections and many others and produce a sealing compound which is essentially more effective than those previously known is the prime object of this invention. Other objects will be in part obvious and in part particularly pointed out hereinafter.

The present invention involves the mixture of graphite, preferably in powdered form, with corn syrup, sometimes designated as glucose, in such proportions that the water content of the syrup may be evaporated when the compound is used, leaving a graphite distribution in a viscous or glutinous film between the parts of the joint, which film is distinctly resistant to solubility by the fluid within the pipe line or container even though the fluid be water.

Corn syrup, on account of its high dextrose content, is highly adhesive. It does not matter whether or not the parts of the joint have been cleaned prior to the treatment; the compound will adhere and thoroughly coat the parts. The highly viscous syrup and the graphite body or filler drys even under normal or atmospheric temperatures to a viscous film which is suitable for the effective sealing of so-called cold joints. In the case of hot joints, the higher temperatures expand the composition by the generated steam and gases as the water content of the syrup is converted and passed off. This effectively fills the space between the united parts. An improved and highly effective product is provided in that it is adapted to seal either hot or cold joints; in that it is sufficiently adhesive to coat the parts, whether dry and clean, or moist and dirty, or oily; in that acid conditions are minimized, reducing liability of corrosion; and in that no discoloration of alcohol or turpentine takes place should any of the compound reach these fluids in the container or pipe line. Owing to the fact that corn syrup is in a sense a manufactured product, and owing to the high temperature processes employed in the manufacture, the syrup comes to the market generally considered as sterile. While in the abstract it may be considered as a fermentable product, nevertheless when compounded according to the following example no difficulties have arisen on account of fermentation. There has been no bursting of packages, blowing off of the covers of the cans, or pitting of metal, and this generally favorable condition exists although many thousands of cans have been placed upon the market without the addition of any preservative.

The graphite, in addition to its service as a filler, provides innumerable points of surface contact with the metal of the joint whereby its lubrical properties are effective to prevent sealing of the joint parts in such a way that they can not be physically broken with ease when desired.

The following is an example of a preferred compound and manner of compounding. To four pounds by weight of corn syrup add three pounds of powdered graphite. Mix and knead thoroughly by machine for approximately thirty minutes until the graphite is substantially evenly distributed throughout the syrup and the mass is of a consistency of a putty. If desired, a neutralizing agent such as lime, preferably air-slacked, may be added, which should be in the quantity of about one-quarter of a pound for the above quantities of graphite and corn syrup. These proportions should be varied according to the grades of graphite and corn syrup.

The terms corn syrup or glucose used herein have particular reference to the well known product almost entirely made in this country from corn starch but made in other countries from potato starch. It is intended, however, to include by these terms as used herein any starch reduced to sugar by acid treatment.

What I claim is:—

1. A sealing compound comprising graphite thoroughly mixed with corn syrup as the main ingredients thereof.

2. A sealing compound comprising graphite thoroughly mixed with corn syrup in approximately the proportions of three parts of graphite to four parts of corn syrup.

3. A sealing compound comprising graphite and corn syrup which dries in the form of a viscous film at temperatures below two hundred and twelve degrees (212°) Fahrenheit and expands and hardens at temperatures above two hundred and twelve degrees (212°) Fahrenheit.

4. A sealing compound comprising graphite thoroughly distributed in a viscous vehicle made from starch reduced to sugar by acid treatment.

5. A sealing compound comprising graphite thoroughly mixed with corn syrup and a small quantity of lime.

ALBERT M. COLEMAN.